Oct. 16, 1956 W. SCHIAVONI 2,767,256

TEST TRUNK CIRCUIT

Filed Sept. 10, 1953 3 Sheets-Sheet 1

INVENTOR
W. SCHIAVONI
BY John E. Cassidy
ATTORNEY

Oct. 16, 1956 W. SCHIAVONI 2,767,256

TEST TRUNK CIRCUIT

Filed Sept. 10, 1953 3 Sheets-Sheet 2

INVENTOR
W. SCHIAVONI
BY
John E. Cassidy
ATTORNEY

TEST TRUNK CIRCUIT

Filed Sept. 10, 1953 3 Sheets-Sheet 3

INVENTOR
W. SCHIAVONI
BY John E. Cassidy
ATTORNEY 2,767,256

TEST TRUNK CIRCUIT

William Schiavoni, Providence, R. I., assignor to Bell Telephone Laboratories, Incorporated, New York, N. Y., a corporation of New York Application September 10, 1953, Serial No. 379,425

10 Claims. (Cl. 179—175)

This invention relates to communication switching and testing systems and more particularly to a trunk circuit employed in such systems. Yet more specifically this invention is a trunk circuit employed, for instance, in interconnecting a testing position at a test board or test desk and a telephone switchboard operator's position, such as a trunk position at a toll switchboard, where access may be had to toll trunks which are to be tested, which toll trunks are individually extended, as it were, through the medium of the present trunk to the test facility for testing. In the operation of the present trunk it is contemplated that the operator at the toll switchboard, for instance, will cooperate in establishing connection to a designated toll trunk extending from her position to a distant city so that the toll trunk may be tested by the test man at the test board.

The present trunk is particularly characterized by a trunk testing channel and a separate trunk communication channel, by means of which latter the test man and the operator may communicate so as to interchange information necessary to the interconnection of the test channel of the present trunk to the toll trunk, for instance, controlled by the telephone operator, designated for testing at a particular time. The present trunk is further characterized by a cooperative supervisory system for the two channels having interacting controls.

The invention may be understood from the following description when read in connection with the associated drawings which together disclose two preferred embodiments in which the invention is presently incorporated. It is to be understood, however, that the invention is not limited to the two embodiments herein disclosed but may be incorporated in other embodiments which will be readily suggested to those skilled in the art by a consideration of the present disclosure.

In order to facilitate an understanding of the invention, the detailed description herein is limited to the operation of the present trunks per se, the cord circuits at the test position and at the toll operator's position and the toll trunk circuits being well known in the art. The conditions imposed on the present trunk by the connecting circuits are explained. The present trunk will function with any of a large number of circuits having such conditions on its connecting terminals.

Examples of cord and operator position circuits with which the present trunk circuits connect are disclosed in Patent 2,339,425 granted to L. F. Porter January 18, 1944 and Patent 2,276,515 granted to T. D. Robb March 17, 1942. Examples of toll trunk circuits to which the present trunk circuits connect are disclosed in Patent 2,005,590 granted to J. Meszar June 18, 1935 and Patent 2,209,777 granted to R. E. King and O. R. Miller July 30, 1940. All of these patents are incorporated herein by reference as though fully set forth herein.

Figures 1, 4, 5:
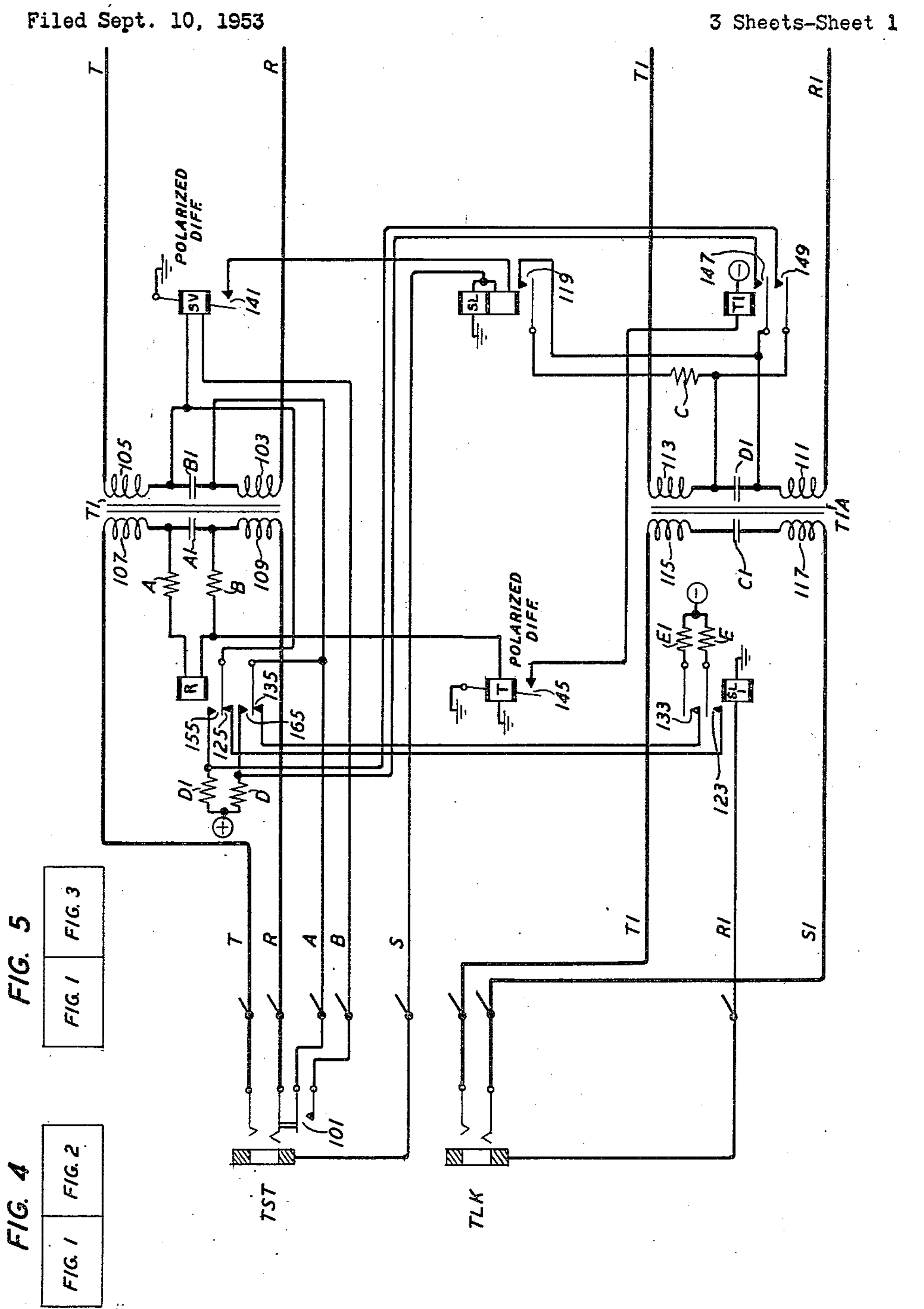
Figure 2:
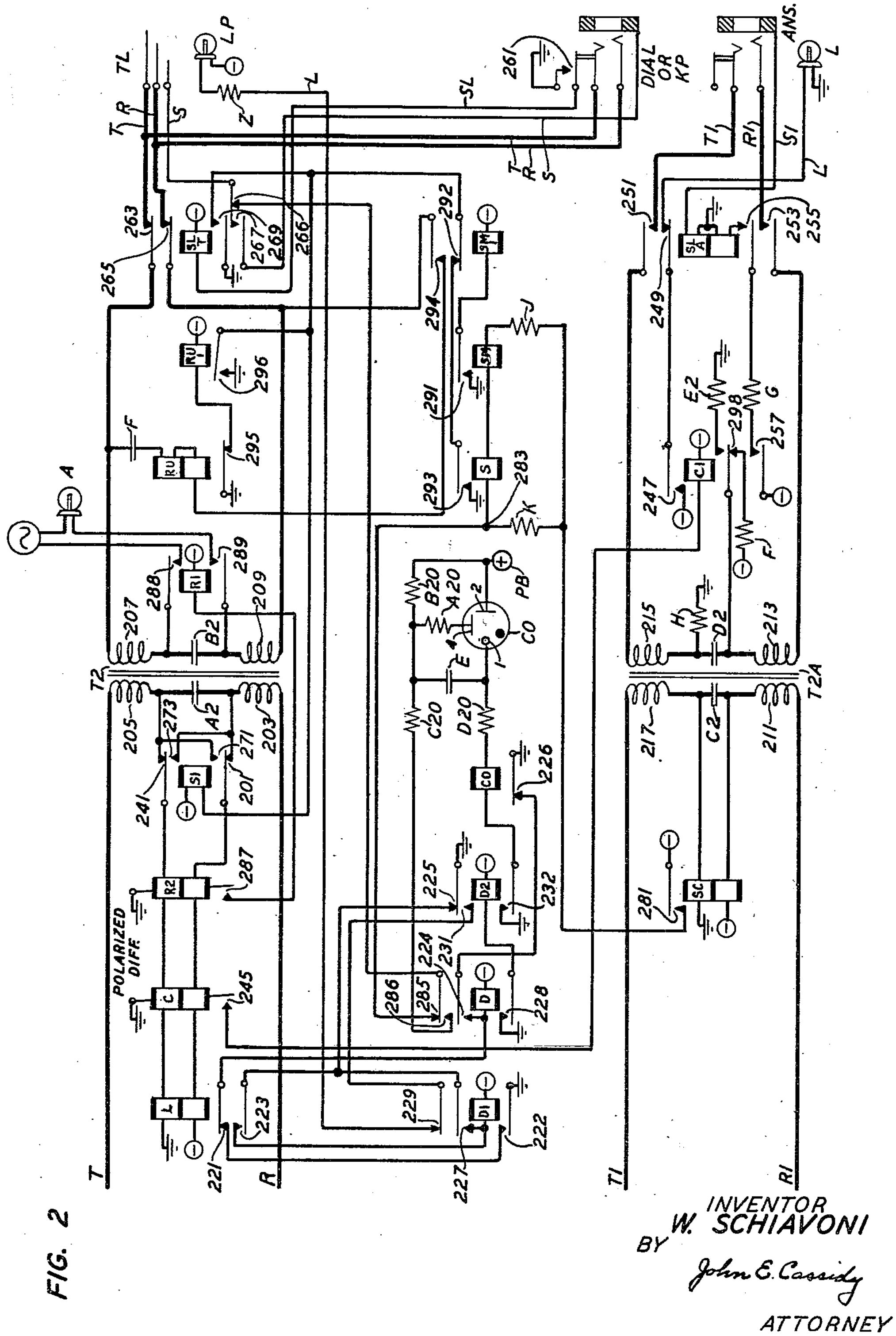
Figure 3:
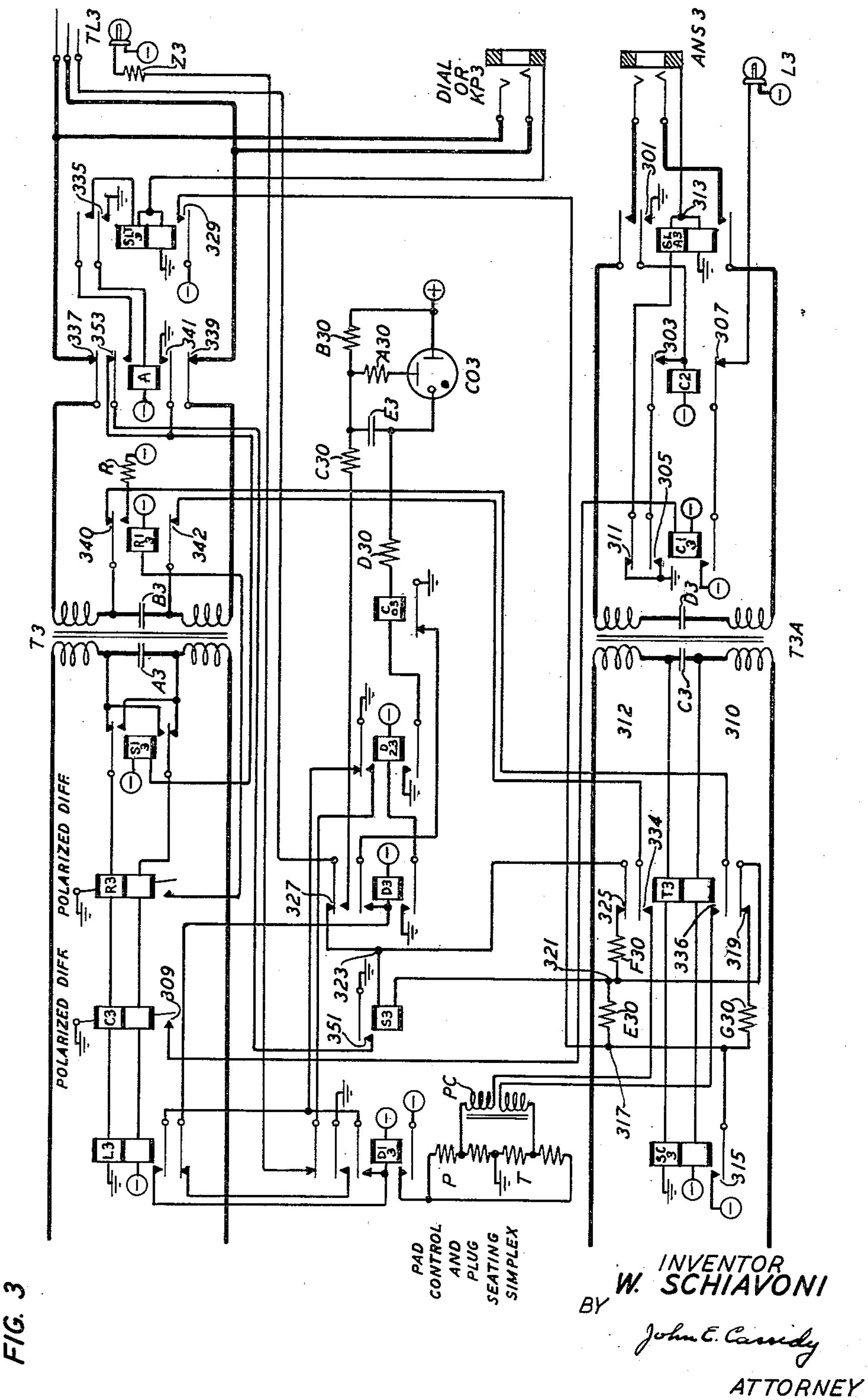

In the drawings, Figs. 1 and 2, taken together and disposed as in Fig. 4, disclose a first preferred embodiment of the trunk circuit of the invention; and Figs. 1 and 3, taken together and disposed as in Fig. 5, disclose a second preferred embodiment of the trunk circuit of the invention.

Refer now to Figs. 1 and 2, disposed as in Fig. 4.

The conductors shown extending toward the right-hand margin in Fig. 1 connect with the similarly designated conductors shown extending to the left-hand margin in Fig. 2. The test and talk jacks, designated TST and TLK, respectively, shown at the left in Fig. 1 may be understood to appear in a test board or test desk which is administered by a test or maintenance man. The jacks shown at the lower right in Fig. 2, designated DIAL or KP and ANS, respectively, and the lamp associated therewith, designated L, together with the test plug designated TL and the lamp associated therewith, designated LP shown at the upper right in Fig. 2, appear at an operator's position in a toll board, for instance. Interconnecting these facilities are two separate two-conductor channels, one channel for testing, the two conductors of which are designated T and R and another channel, by means of which the test man may communicate with the operator, the two conductors of which are designated T1 and R1. The trunk is arranged to perform a number of functions, among which are the following:

Provides a testing path T and R and a talking path T1 and R1 between the testing facility and the toll switchboard, for instance.

Closes the test pair loop as a seizure signal when the plug of a test cord is inserted in the test jack.

Indicates the closure of the testing trunk sleeve circuit by the closure of the talking path loop.

Applies a negative 130-volt battery simplex to the outgoing tip and ring of the testing pair to signal the distant toll operator when the plug of a testing cord is inserted in the jack of the talking pair.

Applies a positive 130-volt battery simplex to the outgoing tip and ring of the talking pair when a talking key of the test cord, not shown, associated with the test path is operated.

Applies a positive 130-volt battery simplex to the outgoing tip and ring conductors of the testing pair as a ringing signal while ringing on the testing cord, not shown, associated with the testing pair.

Provides means for reversing switchhook supervision from a connected intertoll trunk over the testing pair and relaying it to the connected test cord circuit.

Provides for sending separate disconnect signals to the distant toll office over each pair, when the plug of a testing cord is removed from the associated trunk testing jack.

Provides means whereby the test man may call or recall the toll switchboard operator.

Provides means for making a busy test of the outgoing trunk circuits which are to be tested.

Provides means for seizing idle trunks which are to be tested and making them busy.

Provides means whereby the test man may monitor, with an open sleeve, on busy trunk circuits to which connection has been made for testing, and may hold the connection when the trunks become idle.

Provides a path through the toll switchboard end of the present trunk through which the toll switchboard operator may dial or pulse over the outgoing trunk circuit.

Provides for the reception of different kinds of supervisory signals from the different types of trunks which are to be tested.

Provides a locked-in disconnect signal at the toll switchboard when the cord at the test board is disconnected.

*Trunk seizure*

In order to seize the present trunk, the plug of a cord circuit is inserted by the test man in the test jack TST associated with the test pair. In response to this, contact 101 is closed. This establishes a circuit which may be traced from battery in Fig. 2 through the bottom winding of relay L, bottom winding of relay C, bottom winding of relay R2, contact 201 of relay S1, winding 203 of inductance coil T2, conductor R, winding 103 of inductance coil T1, Fig. 1, conductor A, contact 101, conductor B, winding of polar relay SV, winding 105 of inductance coil T1, conductor T, winding 205 of inductance coil T2, contact 241 of relay S1, top winding of relay R2, top winding of relay C and top winding of relay L to ground. Polarized relay SV in Fig. 1 and polarized differential relays C and R2 in Fig. 2 do not operate at this time, but relay L in Fig. 2 does operate. The sleeve circuit of the cord circuit, not shown, assumed to be connected to jack TST in Fig. 1 will normally be closed. This will establish a circuit from battery in the sleeve of the connected cord through the sleeve of jack TST and the top winding of relay SL to ground operating relay SL. This closes the loop of the talking pair between the test man and the operator. The path may be traced from battery in Fig. 2 through the bottom winding of relay SC, winding 211 of inductance coil T2A, conductor R1, winding 111 of inductance coil T1A in Fig. 1, contact 119 of relay SL, resistor C, winding 113 of inductance coil T1A, conductor T1, winding 217 of inductance coil T2A and the top winding of relay SC to ground operating relay SC. The effect of the operation of relay SC will be described hereinafter.

To return to relay L, Fig. 2, the operation of relay L by opening contact 221 opens the operating path of relay D. The operation of relay L by closing contact 223 establishes a circuit from battery through the winding of relay D1, contact 223 and contact 225 of relay D2 to ground operating relay D1. Relay D1, when operated, is locked over a path from battery through the winding of relay D1, contact 227 and contact 225 to ground. Relay D1, when operated, opens the path for lighting the disconnect lamp LP. The circuit may be traced from battery through the filament of disconnect lamp LP, resistor Z to now open contact 229. When contact 229 is closed, and relay D2 is operated, in a manner to be described, the circuit is extended through contact 231 of relay D2 to ground.

*Operation of talking circuit between test man and operator*

When the test board attendant desires to communicate with the toll operator, he inserts the plug of a second cord, not shown, into the talk jack TLK. This supplies battery from the cord through the sleeve of jack TLK, conductor R1, and the winding of relay SL1 to ground operating relay SL1. This establishes a simplex circuit from negative battery through resistor E, contact 123, contact 125, winding 105 of inductance coil T1, conductor T, winding 205 of inductance coil T2, contact 241, top winding of relay R2, top winding of relay C and top winding of relay L to ground. The other path of the simplex circuit established by the operation of relay SL1 may be traced from negative battery through resistor E1, contact 133, contact 135, winding 103 of inductance coil T1, conductor R, winding 203 of inductance coil T2, contact 201, bottom winding of relay R2, bottom winding of relay C and bottom winding of relay L to negative battery. In response to the establishment of the simplex circuit, the armature of polarized differential relay C in Fig. 2 is actuated to the left to close its contact 245. This establishes a circuit from ground through the armature and contact 245 of relay C and the winding of relay C1 to battery operating relay C1. The operation of relay C1 establishes a circuit from battery through contact 247, contact 249 and the filament of lamp L to ground lighting lamp L.

The operator at this toll switchboard will connect a cord circuit, not shown, to the answering jack ANS in Fig. 2. This supplies battery to the sleeve of the answering jack ANS and the circuit is extended through the top winding of relay SLA to ground operating relay SLA. The operation of relay SLA by closing contacts 251 and 253 closes the talking path. By opening contact 249 it extinguishes lamp L and by closing contact 255 establishes a path from ground through the bottom winding of relay SLA, contact 255, resistor G and contact 257, which was closed through the operation of relay C1, to battery locking relay SLA.

The talking path in the trunk is now in condition so that information may be passed over it from the test board to the operator's position and the operator will be informed as to the trunk to which connection is to be made for testing.

*Test line plugged up to intertoll trunk*

In accordance with the test man's instructions, the operator may either connect the plug of the test line cord TL directly to the jack of the trunk to be tested, or the operator may connect a regular cord circuit to the dial or key pulsing jack DIAL or KP and first make a busy test with the tip of the plug TL of the test line cord before inserting it in the jack of the trunk to be tested.

If the trunk under test is a dial-pulsing trunk or direct-current key-pulsing trunk, the test man will ask the operator to dial or direct-current key-pulse the required number by connecting her regular cord to jack DIAL or KP and then dialing or key-pulsing the required number. If the trunk to be tested requires multifrequency pulsing, either the toll operator or the test man can key up the number. Before the test man can transmit multifrequency pulses, however, the toll operator must disconnect her cord from jack DIAL or KP. By dial pulsing is meant the transmission of trains of pulses through the operation of the telephone dial. By key pulsing is meant the operation of a key plunger to perform the same function, there being one key plunger for each digit. By multifrequency pulsing is meant the actuation of keys to transmit permutations of alternating currents of selected frequencies. The pulsing controls the operation of switches connected to the toll trunk to direct the call to its destination. This is well known in the art.

When the dial operator connects her cord to jack DIAL or KJ, contact 261 is closed and a circuit is established from ground through contact 261 and the winding of relay SLT to battery operating relay SLT. The operation of relay SLT by opening contacts 263 and 265 opens the testing path toward the test position. The operation of relay SLT by opening contact 266 disconnects the normal sleeve circuit from the sleeve of plug TL and by closing contact 267 connects the sleeve of plug TL to the sleeve of jack DIAL or KP which is connected through the sleeve circuit of the cord connected thereto.

*Supervisory signal at test position as indication of connection to jack DIAL or KP*

The present circuit provides a supervisory signal at the test position as an indication of the connection of a cord to jack DIAL or KP and of its disconnection therefrom which will now be described.

The operation of relay SLT also establishes a circuit from ground through contact 269 and the winding of relay S1 to battery operating relay S1. The operation of relay S1 by opening contacts 201 and 241 and closing contacts 271 and 273 reverses the battery and ground connections extending through the bottom and top winding of relays L, C and R2 in series to the tip and ring of the path extending over the test trunk toward the test position. In response to the reversal of the battery and ground conditions at the contacts of relay S1, as described, relay SV in Fig. 1 will be operated over the path traced through its winding in the foregoing so as to close its contact 141. This establishes a circuit from ground through the armature and contact 141 of relay SV and the bottom winding of relay SL to the junction of the path extending through the top winding of relay SL to ground. As a result of this the top and bottom windings of relay SL are connected in parallel to ground so that the resistance of the sleeve circuit through jack TST is reduced from 1,800 ohms, for instance, to approximately 80 ohms, for instance. This establishes a condition which causes the lighting of a supervisory lamp in the cord circuit, not shown, connected to jack TST. This supervisory signal condition is called herein the on-hook supervisory condition.

The on-hook supervisory condition, described in the foregoing, is maintained over the test pair to the test board attendant as long as a cord is connected to the jack DIAL or KP used for dialing or key-pulsing at the toll switchboard.

When the operator later removes the cord from jack DIAL or KP, relay SLT releases in turn releasing relay S1 and restoring the battery and ground connections through its contacts to normal. Relay SV in Fig. 1 releases, restoring the sleeve circuit of jack TST to its normal high resistance condition and extinguishing the supervisory lamp in the test cord connected to jack TST as an indication that the toll operator has now removed the cord from jack DIAL or KP. This supervisory condition is known as the off-hook condition. The supervisory lamp in the test man's cord will also be lighted and extinguished in response to conditions of the toll trunk to which test plug TL is connected. This will be described hereinafter.

*Monitoring*

When the test line plug TL of the test line cord is connected to the jack of the trunk to be tested, the test man at the test board can monitor on the connection so long as he maintains the sleeve circuit of the cord, not shown, connected to jack TST open and so long as the toll operator has disconnected her cord from jack DIAL or KP. While the sleeve circuit of the test man's cord is maintained open, relay SL remains released. If the toll circuit selected for test to which the plug TL of the test cord is connected, is busy, the test man at the test position can either wait until the trunk selected for test becomes idle or he may disconnect and make the test at another time. Assuming that the test man waits until the toll circuit to be tested does become idle, the test man can thereupon seize the trunk by closing the sleeve circuit of his cord, not shown, by releasing the monitoring key therein. In response to this, relay SL will reoperate, in turn causing the operation of relay SC in Fig. 2 over a circuit heretofore traced. This establishes a circuit from negative battery through contact 281 to parallel branches, one of which extends through resistor K to junction 283 and the other of which extends through resistor J and the winding of relays SM and S in series, to junction 283, from which point the circuit continues through contact 285 and contact 266 to the sleeve of test plug TL. The resistance in this path may be approximately 113 ohms, for instance. The connection of battery through this resistance in the sleeve circuit effects the seizure of the connected circuit.

*Ringing*

When the test board attendant operates a ringing key associated with the test cord connected to test jack TST, battery is applied over lead T through winding 107, of inductance coil T1, resistor A, winding of relay R and winding of relay T to ground. In response to this, relay R operates. The operation of relay R by opening contacts 125 and 135 disconnects the negative 130-volt battery simplex and by closing contacts 155 and 165 connects a positive 130-volt battery through resistors D1 and D on a simplex basis to the test pair. The circuit may be traced from positive battery through resistor D1, contact 155, winding 105, conductor T, winding 205 of inductance coil T2, contact 241, and the top winding of relay R2, C and L to ground. The other portion of the simplex circuit may be traced from positive battery through resistor D, contact 165, winding 103, conductor R, winding 203, contact 201 and the bottom winding of relays R2, C and L to negative battery. The effect of this is to release relay C and to operate relay R2 so as to close its contact 287. A circuit may then be traced from ground through the armature and contact 287 of relay R2 and the winding of relay R1 to battery operating relay R1. The operation of relay R1 establishes a circuit from a source of alternating ringing current through the filament of lamp A, through contacts 288 and 289, windings 207 and 209, contacts 263 and 265 to the tip and ring conductors of plug TL and into the connected intertoll trunk to ring the connected facility.

When the ringing key is restored by the test board attendant, relay R releases and removes the positive 130-volt battery simplex from the test pair and reconnects the negative 130-volt battery simplex thereto. This in turn releases relay R2 in Fig. 2 which releases relay R1 and removes the source of ringing from the path extending into the intertoll trunk. Further, relay C reoperates in response to the connection of the negative battery simplex.

*Sleeve supervision between toll trunk and test board*

The trunk circuit of the present invention is arranged so that it may be connected to different kinds of toll trunk circuits to permit the testing of the various toll trunk facilities in a large well-known communication system. In order to permit this, a portion of the trunk associated with the testing cord and plug TL, shown at the right in Fig. 2, may be arranged in a number of different manners. As shown in the present embodiment in Fig. 2, the present trunk is arranged for sleeve supervision for connection to ring-down trunks or to other sleeve supervision circuits.

When plug TL is connected to a ring-down toll line, relays S and SM in the sleeve circuit, heretofore traced, will operate. The operation of relay SM, by closing contact 291, establishes a circuit from ground through contact 291 and the winding of relay SM1 to battery operating relay SM1. The operation of relay SM1, by closing contact 294, connects the windings of relay RU in series with condenser F across the tip and ring conductors of the path extending through plug TL. This arranges the circuit for the reception of an alternating-current signal from the connected toll trunk for ringing supervision. The operation of relay SM1 by opening contact 292 disconnects the ground furnished through contact 293 of operated relay S from the path which extends through the winding of relay S1. The reason for this will be made clear hereinafter.

When ringing current is applied to the tip and ring of plug TL from the distant toll office, relay RU operates and by opening contact 295 releases relay RU1, which is normally operated. The release of relay RU1, by closing contact 296, establishes a circuit from ground through contact 296 and the winding of relay S1 to battery operating relay S1. The operation of relay S1 reverses the battery connections to the path extending towards the test position and controls a supervisory signal therein in the manner described in the foregoing. This signal serves as a recall or a disconnect signal. The signal will persist only while the ringing condition is applied to relay RU. When the ringing is discontinued, relay RU releases reoperating relay RU1. The reoperation of relay RU1 releases relay S1 to change the condition of the signal at the test board to indicate the off-hook condition.

When plug TL is connected to a trunk other than a ring-down trunk, it is arranged for sleeve supervision. Relay S will operate from an on-hook condition of the trunk. Relay SM will not operate. This establishes a circuit from ground through contact 293 of relay S, contact 292 of relay SM1, which will be in the released condition and the winding of relay S1 to battery operating relay S1. This effects the operation of the supervisory signal at the test position to indicate the on-hook condition, as described in the foregoing. When the condition of the trunk, to which plug TL is connected, is changed to the off-hook condition the resistance of the sleeve connection in the toll trunk is increased, causing relay S to release. This, in turn, releases relay S1 and produces the off-hook supervisory signal at the test position.

A disconnect signal from the connected toll trunk will again reduce the resistance of the sleeve of the toll trunk and relay S will operate. The operation of relay S will again operate relay S1 to again change the supervisory signal at the test position to the on-hook condition which indicates the disconnection.

*Disconnect signals between operators at toll switchboard and test man at test position*

In addition to the other control signals which may be passed over the present trunk, additional signal features are incorporated in the present trunk which will now be described.

When the test man is through talking to the toll operator and disconnects his cord from jack TLK relay SL1 will release. This will disconnect the negative battery simplex from the test path over conductors T and R and through the top and bottom windings of relays R2, C and L. Relay C will thereupon release. The opening of contact 245 of relay C in turn releases relay C1. The release of relay C1 will establish a circuit from negative battery through resistor F, contact 298, winding 213 of inductance coil T2A, contact 253 to the ring of jack ANS which controls a supervisory signal in the connected cord to indicate that the test man has disconnected his cord from jack TLK. In response to this, the toll operator will remove her cord from jack ANS, releasing relay SLA and restoring the talking circuit to normal. When the test board attendant removes the plug of the test cord from jack TST the test pair loop is opened at contact 101. Further the sleeve circuit of jack TST is opened and relay SL releases. The opening of the test pair loop releases relay L in Fig. 2. The release of relay L by closing contact 221 establishes a circuit from battery through the winding of relay D, contact 221, and contact 222 to ground operating relay D. Relay D operated locks over a path from battery through the winding of relay D, contact 224 and contact 226 to ground. The operation of relay D also establishes a circuit from ground through contact 228 and the winding of relay D2 to battery operating relay D2. Relay D2 operated provides the ground for lighting the disconnect lamp and removes the locking ground from relay D1 which releases. The circuit for lighting the disconnect lamp may be traced from ground through contact 231, contact 229, resistor Z and the filament of lamp LP to ground. The disconnect lamp LP will remain lighted so long as the plug TL of the test line cord is connected to the trunk under test. The operation of relay D establishes a circuit from ground through battery PB, resistor B20, resistor C20, contact 286, contact 266 and through the sleeve of plug TL to ground in the connected toll trunk. Resistor A20 is connected from the junction of resistors B20 and C20 to control electrode 4 of gas-filled cold cathode tube C0. With the test line cord connected to the toll trunk, the voltage drop across resistors C20 is such that there is insufficient voltage across electrodes 1 to 4 of tube C0 to activate tube C0.

When the toll operator disconnects plug TL from the toll trunk the path through resistor C20 is open at the cord sleeve. This causes the potential across the control gap electrodes 1 to 4 of tube C0 to rise to practically the full voltage of plate battery PB. This potential is now high enough to activate the control gap of the tube which in turn activates the main gap between terminals 1 and 2 and establishes a circuit from battery PB through the main gap 2—1 of tube C0, resistor D20, winding of relay C0 and contact 232 to ground operating relay C0. The operation of relay C0 by opening a contact 226 removes the locking ground from relay D and relay D thereupon releases. Relay D released in turn releases relay D2 by opening contact 228. Relay D2 released by opening contact 231 extinguishes the disconnect lamp and the circuit is restored to normal.

*Embodiment per Fig. 1 and Fig. 3*

Refer now to Figs. 1 and 3 disposed as in Fig. 5 which show a second preferred embodiment of the present invention.

It was explained in the foregoing that the present trunk is connectable to any one of several different kinds of trunks at the toll switchboard. For certain of these trunks, to which the present circuit may be connected, the right-hand portion of the present trunk is arranged as disclosed in Fig. 3. Fig. 3, as may be observed from a comparison between it and Fig. 2, resembles the arrangement in Fig. 2 quite closely. Corresponding apparatus elements in Fig. 2 and Fig. 3 are identified by the same designations with the numeral 3 appearing after the designation of the apparatus element in Fig. 3. That is to say, the relay L, for instance, is identified by the designation L in Fig. 2 and the designation L3 in Fig. 3. These corresponding elements in the two figures operate in the same manner in each figure. In cases where the operation of the apparatus elements differ, the difference will be described hereinafter.

*Call wire operation*

In the operation of calling from the test board to the toll operator's position the circuit functions as described for the embodiment in Fig. 1 and Fig. 2. However, in the case of the embodiment per Fig. 1 and Fig. 3, the operation of the circuit, when the toll operator responds to the lighted calling lamp L3, is slightly different and will now be described.

When the toll operator answers, relay SLA3 is operated from battery in the operator's cord circuit connected to the sleeve of jack ANS3 over a circuit extending through the bottom winding of relay SLA3 to ground. The operation of relay SLA3 closes the talking path between the test man and the toll operator and also establishes a path from ground through contact 301 and the winding of relay C2 to battery operating relay C2. Relay C2 operated locks over a path from battery through the winding of relay C2, contact 303 and contact 305 to ground, relay C13 being operated at this time. The operation of relay C2 by opening contact 307 extinguishes lamp L3. Lamp L3 will be locked out until the test man disconnects his cord from jack TLK.

When the conversation between the test man and the toll operator is ended, the test man will remove the cord circuit from jack TLK. In response to this, relay C3 will release opening contact 309 and releasing relay C13. The release of relay C13 by closing contact 311 establishes a path from ground through contact 311 and the top winding of relay SLA3 to the junction 313 between the top and bottom windings of relay SLA3 thereby reducing the resistance in the sleeve circuit of Fig. 3. In response to this, a relay in the operator's cord circuit, connected to jack ANS3, will be controlled to light a supervisory lamp in the cord as a disconnect signal. When the toll operator disconnects the cord circuit from jack ANS3, the supervisory lamp in the cord circuit will be extinguished and the talking pair, between the test man and the toll operator and the relays associated therewith, will be restored to normal.

*Test line plugged up to intertoll trunk*

When the toll operator connects her cord to the jack DIAL or KP3, battery on the sleeve of the cord is extended through the sleeve of the jack and the bottom winding of relay SLT3 to ground operating relay SLT3. The operation of relay SLT3, by closing contact 335, establishes a circuit from ground through contact 335 and the winding of relay A to battery operating relay A. The operation of relay A, by opening contacts 337 and 339 opens the test path toward the test board. The operation of relay A establishes a circuit from ground through contact 341 and the winding of relay S13 to battery operating relay S13. The operation of relay S13 transmits an on-hook supervisory signal to the test board.

*Monitoring*

The monitoring operation by the test man on the toll trunk, to which plug TL3 is connected, is the same as described under this heading in the foregoing. However, the sleeve circuit connected in Fig. 3 to the sleeve of plug TL3 is different from the corresponding circuit in Fig. 2. The sleeve circuit in Fig. 3 may be traced from battery through contact 329 of relay SLT3 to junction 317 of parallel branches. One branch extends through resistor G30 and contact 319 of relay T3 to junction 321. A parallel branch extends through resistor E30 to junction 321. From junction 321 another parallel circuit is formed. One branch extends through the winding of relay S3 to junction 323 and the other branch extends through resistor F30 and contact 325 to junction 323. From junction 323 the circuit extends through contact 327 of relay D3 to the sleeve of plug TL3.

When the test man releases his monitoring key to seize a trunk, on which he has been waiting, for testing, relay SC3 operates in the manner described for the embodiment per Fig. 1 and Fig. 2. This closes battery through contact 315 to junction 317 in the sleeve circuit of plug TL3. For this condition the magnitude of the resistance in the sleeve circuit of Fig. 3 will be different from that of the sleeve circuit in Fig. 2, 100 ohms, for instance, in the present circuit as distinguished from the 113 ohms, for instance, in the arrangement per Fig. 2, so that the two circuits will cooperate effectively with different connected toll trunk circuit.

*Pad control and plug seating*

When the test man, at the test board, operates the talking key in his cord circuit, a low potential battery simplex is applied to leads T and R of the test pair and the path is extended through the winding of relay T to ground operating relay T. The operation of relay T establishes a circuit from ground through contact 145 and the winding of relay T1 to battery operating relay T1. The operation of relay T1 establishes a circuit from positive battery through resistors D and D1 in parallel, contacts 147 and 149, windings 111 and 113 of inductance coil T1A, conductors R1 and T1, windings 310 and 312 of inductance T3A and the bottom and top windings of relays T3 and SC3 to battery and ground, respectively, operating relay T3. The operation of relay T3, by closing contacts 334 and 336, applies the combined pad control and plug seating simplex across the tip and ring conductors of the test plug through contact 340 and 342, as an indication that the trunk under test should have a pad inserted therein.

The operation of relay T3 by opening contacts 319 and 325 disconnects resistors in parallel branches of the sleeve circuit of plug TL3 thereby increasing the magnitude of the resistance in the sleeve circuit of plug TL3 from 100 ohms to 590 ohms, for instance, in order to restore a flashing recall signal through the connected intertoll trunk circuit.

*Supervision*

When the toll operator connects the test line cord to the jack of the toll trunk under test, relay S3 in the sleeve circuit will operate, if the resistance of the sleeve circuit of the trunk, to which plug TL3 is connected, is low, 80 ohms for instance. If the resistance of the connected sleeve circuit of the toll trunk is high, relay S3 will not operate. When relay S3 operates it establishes a circuit from ground through contact 351, contact 353, relay A being released at this time and through the winding of relay S13 to battery operating relay S13. This transmits an on-hook supervisory signal to the test board. When the receiver at the station connected to the distant end of the toll trunk is lifted, the resistance of the sleeve circuit of the connected trunk is increased to 1800 ohms, for instance, and relay S3 releases. The release of relay S3 in turn releases relay S13 which transmits an off-hook signal to the test board.

*General*

In all other respects the operation of the embodiment per Figs. 1 and 3 is the same as described for the embodiment per Figs. 1 and 2.

What is claimed is:

1. In a telephone system, a first operator's position, a second operator's position, a trunk circuit interconnecting said positions, said circuit having a first communication path comprising a first pair of conductors interconnecting said positions, and a second communication path comprising a second pair of conductors interconnecting said positions, a first means of access to said first path at said first position, a second means of access to said second path at said first position, means of access to said second path and a calling signal individual thereto both at said second position and a control for said signal at said second position responsive to a connection to said first means of access at said first position.

2. In a telephone system, a four-conductor trunk circuit comprising a first and a second pair of communication conductors interconnecting a first and a second switchboard, a supervisory signal control for said first pair of conductors at said second switchboard, a switching relay at said first switchboard individual to said first pair of conductors, means at said first switchboard for operating said relay incident to a connection to said first pair of conductors and responsive to a connection to said means, and means responsive to the operation of said relay for establishing a circuit over said second pair of conductors to actuate said control.

3. In a telephone system, a four-conductor trunk circuit comprising a first and a second pair of communication conductors interconnecting a first and a second switchboard, supervisory signal controls individual to each of said pairs, said controls comprising a direct-current bridge individual to each of said pairs, means individual to said first pair for closing said bridge individual to said second pair and means individual to said second pair for closing said bridge individual to said first pair.

4. In a communication system, a four-conductor trunk comprising a first and a second pair of communication conductors interconnecting a first and a second switchboard, a calling signal individual to said second pair at said second switchboard, a first control for said signal at said second switchboard, and a second control at said second switchboard for said first control, means at said first switchboard individual to said second pair for establishing a simplex circuit over said first pair, and means responsive to the establishing of said simplex circuit for actuating said second control.

5. In a telephone system, a four-wire trunk circuit interconnecting a first and a second switching position, said trunk comprising a first and a second communication channel interconnecting said positions, a simplex circuit establishable over said first channel, a first relay individual to said first channel for establishing said simplex circuit with potential of a first polarity connected thereto, a second relay individual to said second channel for establishing said simplex circuit with potential of a second polarity connected thereto and a potential responsive circuit connected to said simplex circuit at said second switchboard.

6. In a telephone system, a four-wire trunk circuit interconnecting a first and a second switching position, said trunk comprising a first and a second communication channel, a simplex circuit establishable through said first channel, a first control for said simplex circuit, said control responsive to the actuation of means individual to said first channel and a second control for said simplex circuit, said second control actuable responsive to means individual to said second channel.

7. In a telephone system, a four-wire trunk circuit interconnecting a first and a second position, said trunk comprising a first and a second communication channel, a calling signal individual to said first channel, a control for said calling signal, means for arranging said second channel as a simplex signaling circuit and means responsive to said arranging for actuating said control.

8. In a telephone system, a four-conductor trunk circuit interconnecting a first and a second position, said trunk comprising a first and a second communication channel, a plurality of mutual signal controls connected to said channels for regulating traffic over said trunk, flexible means connected to said first channel at said second position for extending said first channel to another circuit, and means of access to said first channel at said second position for pulsing through said flexible means to extend said first channel.

9. In a telephone system, a four-conductor trunk circuit interconnecting a first and a second position, said trunk comprising a first communication channel, said first channel having flexible means for extending said first channel at said second position to another circuit, said trunk comprising also a second communication channel for passing information from said first position to said second position relative to said extension of said first channel, and a plurality of signal controls connected to each of said channels for operating signals individual to the other of said channels to regulate traffic over said trunk.

10. A system in accordance with claim 9 including means for transmitting disconnect signals individual to each of said channels over the other of said channels from said first to said second position.

No references cited.